US012569986B2

(12) United States Patent
Hart et al.

(10) Patent No.: US 12,569,986 B2
(45) Date of Patent: Mar. 10, 2026

(54) ROBOTIC ARM SYSTEM

(71) Applicant: Black-I Robotics, Inc., Tyngsboro, MA (US)

(72) Inventors: Brian T. Hart, Bedford, MA (US); Mischa deRuijter, Harvard, MA (US)

(73) Assignee: BLACK-I ROBOTICS, INC., Tyngsboro, MA (US)

( * ) Notice: Subject to any disclaimer, the term of this patent is extended or adjusted under 35 U.S.C. 154(b) by 111 days.

(21) Appl. No.: 18/189,101

(22) Filed: Mar. 23, 2023

(65) Prior Publication Data

US 2023/0302633 A1 Sep. 28, 2023

Related U.S. Application Data

(60) Provisional application No. 63/323,361, filed on Mar. 24, 2022.

(51) Int. Cl.
| | |
|---|---|
| *B25J 9/16* | (2006.01) |
| *B25J 9/14* | (2006.01) |
| *B25J 19/00* | (2006.01) |
| *B25J 19/04* | (2006.01) |

(52) U.S. Cl.
CPC ................ *B25J 9/162* (2013.01); *B25J 9/14* (2013.01); *B25J 19/005* (2013.01); *B25J 19/04* (2013.01)

(58) Field of Classification Search
CPC ..... B25J 5/007; B25J 9/046; B25J 9/14; B25J 9/162; B25J 19/005; B25J 19/04; B65G 47/904; B65G 47/915; G05B 2219/40298; Y10S 901/01; B66F 9/063; B66F 17/003; A47L 2201/04; A47L 2201/06
See application file for complete search history.

(56) References Cited

U.S. PATENT DOCUMENTS

| | | | | |
|---|---|---|---|---|
| 4,808,058 | A | * | 2/1989 | Carney ................... B60K 1/04 |
| | | | | 414/349 |
| 9,193,065 | B2 | * | 11/2015 | Wang ..................... B25J 13/006 |
| 11,407,118 | B1 | * | 8/2022 | Augenbraun .......... B25J 9/1612 |
| 12,117,532 | B1 | * | 10/2024 | Blanton, Jr. ........... G01S 19/06 |
| 2016/0346922 | A1 | * | 12/2016 | Shelton ................. H02J 7/0013 |
| 2020/0172339 | A1 | * | 6/2020 | Theobald ......... G05B 19/41895 |
| 2020/0316786 | A1 | * | 10/2020 | Galluzzo ................. B25J 9/162 |
| 2020/0375093 | A1 | * | 12/2020 | Matus ................... B60W 30/10 |
| 2022/0183209 | A1 | * | 6/2022 | Scott-Robinson ... A01B 69/008 |
| 2023/0205292 | A1 | * | 6/2023 | Shannon ................. B25J 9/161 |
| | | | | 307/29 |
| 2023/0330872 | A1 | * | 10/2023 | Odai ..................... B25J 19/005 |

* cited by examiner

*Primary Examiner* — Dale Moyer
(74) *Attorney, Agent, or Firm* — Brian J. Colandreo; Heath M. Sargeant; Holland & Knight LLP

(57) ABSTRACT

A self-contained robotic arm system includes: an operating platform; a robotic arm subsystem coupled to the operating platform; a control subsystem coupled to the operating platform and configured to effectuate movement of the robotic arm assembly; and a power subsystem including an internal battery system that is configured to provide electrical power to the robotic arm subsystem and the control subsystem.

23 Claims, 6 Drawing Sheets

ROBOTIC ARM SYSTEM

RELATED APPLICATION(S)

This application claims the benefit of U.S. Provisional Application No. 63/323,361, filed on 24 Mar. 2022, the entire contents of which are incorporated herein by reference.

TECHNICAL FIELD

This disclosure relates to robotic arms and, more particularly, to self-contained robotic arms.

BACKGROUND

Robotic arms are used in industry to automate tasks. For example, such robotic arms may be used to pick up objects, assembly cars, weld metal, machine material, lift heavy objects, and repeatedly perform redundant tasks. As such robotic arms tend to be heavy, they tend to be permanently mounted to rigid bases. For example, such robotic arms may be mounted to a cement base that is proximate an assembly line.

Unfortunately, such a configuration results in robotic arms that are essentially non-moveable. While these robotic arms may be removed from their rigid base to be relocated, it is a complicated process because a new rigid base would need to be constructed and new data and power connections would need to be plumbed.

SUMMARY OF DISCLOSURE

In one implementation, a self-contained robotic arm system includes: an operating platform; a robotic arm subsystem coupled to the operating platform; a control subsystem coupled to the operating platform and configured to effectuate movement of the robotic arm assembly; and a power subsystem including an internal battery system that is configured to provide electrical power to the robotic arm subsystem and the control subsystem.

One or more of the following features may be included. The power subsystem may include: an AC power charging system configured to receive power from an external line voltage source so that the internal battery system of the power subsystem may be charged. The power subsystem may include: a DC power charging system configured to receive power from the operating platform so that the internal battery system of the power subsystem may be charged. The internal battery system of the power subsystem may include: a non-swappable battery portion; and a hot-swappable battery portion that is readily removeable/replaceable. A machine vision system may be configured to enable a user of the self-contained robotic arm system to visually monitor areas proximate the self-contained robotic arm system. An audio system may be configured to enable a user of the self-contained robotic arm system to audibly monitor areas proximate the self-contained robotic arm system. The control subsystem may include one or more of: a pneumatic control subsystem; a electric control subsystem; and a hydraulic control subsystem. The pneumatic control subsystem may include one or more of: pneumatic controls; one or more pneumatic actuators; an air compressor; and an air storage tank. The electric control subsystem may include one or more of: electronic controls; and one or more electronic actuators. The hydraulic control subsystem may include one or more of: hydraulic controls; one or more hydraulic actuators; a hydraulic pump; and a hydraulic fluid storage tank. The robotic arm subsystem may include one or more of: an arm base assembly; a shoulder joint assembly coupled to the arm base assembly; an upper arm assembly coupled to the should joint assembly; an elbow joint assembly coupled to the upper arm assembly; a lower arm assembly coupled to the elbow joint assembly; a wrist joint assembly coupled to the lower arm assembly; and a gripper assembly coupled to the wrist joint assembly. The shoulder joint assembly may be configured to enable rotation about one or more of the X, Y and Z axis. The elbow joint assembly may be configured to enable rotation about one or more of the X, Y and Z axis. The wrist joint assembly may be configured to enable rotation about one or more of the X, Y and Z axis. The operating platform may be a moveable operating platform. The moveable operating platform may include one or more of: an autonomous mobile base; a non-autonomous mobile base; a forklift; and a truck.

In another implementation, a self-contained robotic arm system includes: an operating platform; a robotic arm subsystem coupled to the operating platform; a control subsystem coupled to the operating platform and configured to effectuate movement of the robotic arm assembly; and a power subsystem including an internal battery system that is configured to provide electrical power to the robotic arm subsystem and the control subsystem, wherein the power subsystem includes: an AC power charging system configured to receive power from an external line voltage source so that the internal battery system of the power subsystem may be charged; and a DC power charging system configured to receive power from the operating platform so that the internal battery system of the power subsystem may be charged.

One or more of the following features may be included. The internal battery system of the power subsystem may include: a non-swappable battery portion; and a hot-swappable battery portion that is readily removeable/replaceable. A machine vision system may be configured to enable a user of the self-contained robotic arm system to visually monitor areas proximate the self-contained robotic arm system. An audio system configured to enable a user of the self-contained robotic arm system to audibly monitor areas proximate the self-contained robotic arm system.

In another implementation, a self-contained robotic arm system includes: an operating platform; a robotic arm subsystem coupled to the operating platform; a control subsystem coupled to the operating platform and configured to effectuate movement of the robotic arm assembly; and a power subsystem including an internal battery system that is configured to provide electrical power to the robotic arm subsystem and the control subsystem, wherein the internal battery system of the power subsystem includes: a non-swappable battery portion; and a hot-swappable battery portion that is readily removeable/replaceable.

One or more of the following features may be included. The power subsystem may include: an AC power charging system configured to receive power from an external line voltage source so that the internal battery system of the power subsystem may be charged. The power subsystem may include: a DC power charging system configured to receive power from the operating platform so that the internal battery system of the power subsystem may be charged. A machine vision system may be configured to enable a user of the self-contained robotic arm system to visually monitor areas proximate the self-contained robotic arm system. An audio system configured to enable a user of the self-contained robotic arm system to audibly monitor areas proximate the self-contained robotic arm system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
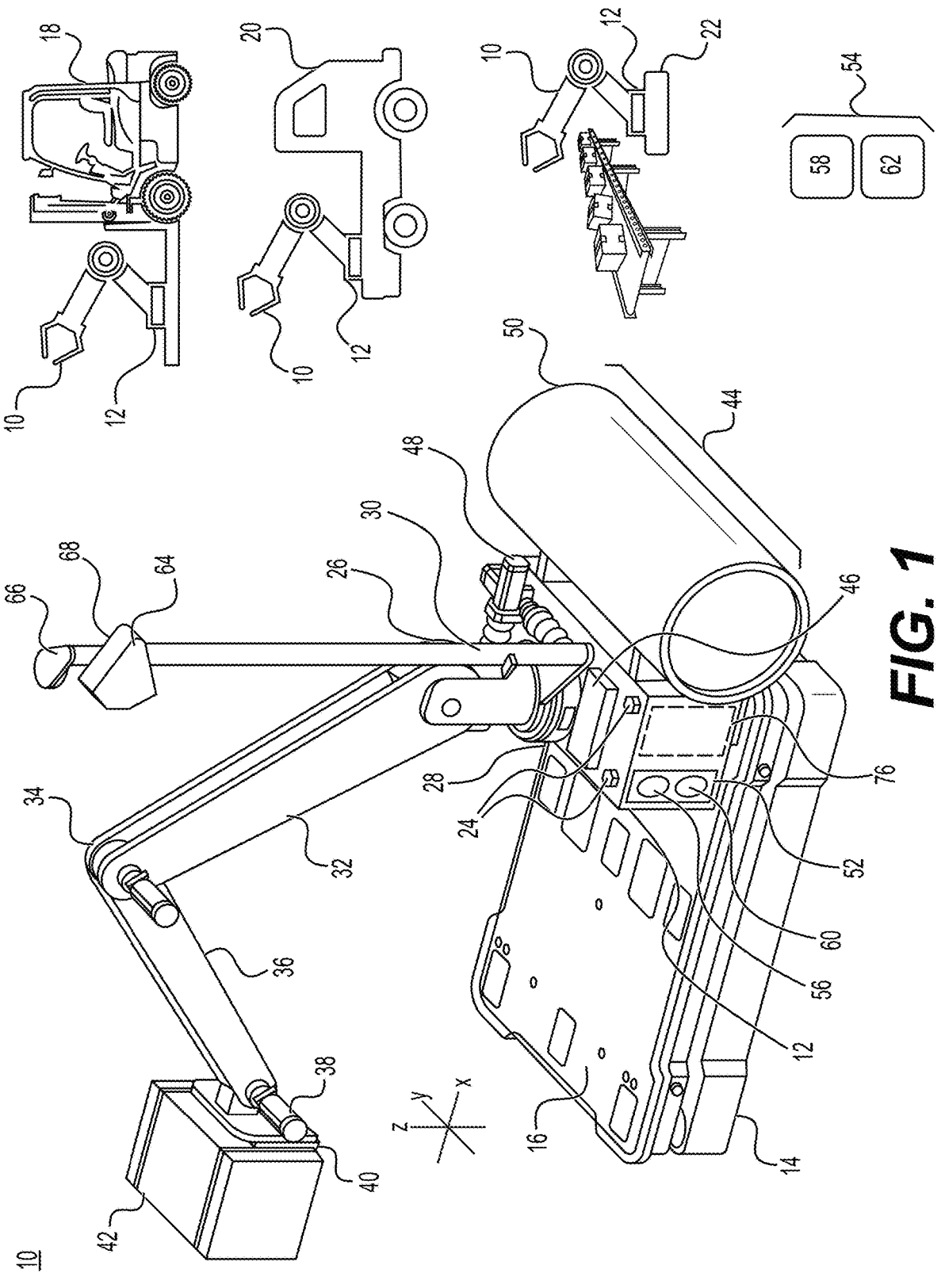
FIG. 1 is an isometric view of a self-contained robotic arm system according to an embodiment of the present disclosure.

Referring to FIG. 1, there is shown self-contained robotic arm system 10. As will be discussed below in greater detail, self-contained robotic arm system 10 is configured to be self-contained, thus allowing it to be easily moveable from one operating environment to another.

Self-contained robotic arm system 10 may include mounting subsystem 12 configured to releasable engage operating platform 14. For example and as will be discussed below in greater detail, mounting subsystem 12 may be a rigid and compact base that allows for easy attachment to (and detachment from) operating platform 14. Accordingly, mounting subsystem 12 may be constructed of plate steel, may be compact in size, and may be used as a mounting point for all of the systems/subsystems of self-contained robotic arm system 10, thus allowing self-contained robotic arm system 10 to be easily attached to (and detached from) operating platform 14 as a single/solitary unit.

The configuration of operating platform 14 may vary depending upon the operating environment of self-contained robotic arm system 10. For example, operating platform 14 may be a moveable operating platform or a stationary operating platform.

Examples of a moveable operating platform (i.e., operating platform 14) may include but are not limited to: autonomous mobile base 16 (e.g., an intelligent mobile base that is fully (or partially) autonomous and is used within an automated warehouse); a non-autonomous mobile base (e.g., a non-intelligent mobile base that is manually driven/controlled by a user; not shown); forklift 18 (e.g., that is configured to receive self-contained robotic arm system 10); and truck 20 (e.g., that is configured to receive self-contained robotic arm system 10).

An example of a stationary operating platform (i.e., operating platform 14) may include but is not limited to: assembly line stationary base 22 (that is positioned proximate an assembly line).

Mounting subsystem 12 may be configured to releasably engage operating platform 14 with one or more assemblies (e.g., assemblies 24), examples of which may include but are not limited to: one or more releasable fasteners (e.g., nut and bolt assemblies); one or more releasable clamps (e.g., leverage-based clamps); and one or more releasable grasping assemblies (e.g., screw-type clamps). Accordingly and through the use of assemblies 24, mounting subsystem 12 may be quickly and easily detached from operating platform 14. And since (as discussed above) mounting subsystem 12 may be used as a mounting point for all of the systems/subsystems of self-contained robotic arm system 10, self-contained robotic arm system 10 may be easily attached to (and detached from) operating platform 14 as a single/solitary unit.

Self-contained robotic arm system 10 may include robotic arm subsystem 26 coupled (i.e., directly or indirectly) to mounting subsystem 12. Robotic arm subsystem 26 may include one or more of:

Arm Base Assembly: Arm base assembly 28 may be coupled to mounting subsystem 12 and may be configured to allow self-contained robotic arm system 10 to rotate about the Z-axis with respect to mounting subsystem 12.

Shoulder Joint Assembly: Shoulder joint assembly 30 may be coupled to arm base assembly 28 and may be configured to allow upper arm assembly 32 rotate about the Y-axis with respect to arm base assembly 28. Additionally, shoulder joint assembly 30 may be configured to allow for more complex movements. For example, shoulder joint assembly 30 may also be configured to enable rotation about one or more of the X and Z axes.

Upper Arm Assembly: Upper arm assembly 32 may be coupled to shoulder joint assembly 30 and may be constructed of various materials, such as steel, aluminum, titanium and carbon fiber. Additionally, upper arm assembly 32 may be configured to be longitudinally-extendable along the longitudinal axis of upper arm assembly 32, thus enabling self-contained robotic arm system 10 to have an extended reach when needed.

Elbow Joint Assembly: Elbow joint assembly 34 may be coupled to upper arm assembly 32 and may be configured to allow lower arm assembly 36 to rotate about the Y-axis with respect to upper arm assembly 32. Additionally, elbow joint assembly 34 may be configured to allow for more complex movements. For example, elbow joint assembly 34 may also be configured to enable rotation about one or more of the X and Z axes.

Lower Arm Assembly: Lower arm assembly 36 may be coupled to elbow joint assembly 34 and may be constructed of various materials, such as steel, aluminum, titanium and carbon fiber. Additionally, lower arm assembly 36 may be configured to be longitudinally-extendable along the longitudinal axis of lower arm assembly 36, thus enabling self-contained robotic arm system 10 to have an extended reach when needed.

Wrist Joint Assembly: Wrist joint assembly 38 may be coupled to lower arm assembly 36 and may be configured to allow gripper assembly 40 to rotate about the Y-axis with respect to lower arm assembly 36. Additionally, wrist joint assembly 38 may be configured to allow for more complex movements. For example, wrist joint assembly 38 may also be configured to enable rotation about one or more of the X and Z axes.

Gripper Assembly: Gripper assembly 40 may be coupled to wrist joint assembly 38 and may be configured to grasp various objects. For example, gripper assembly 40 may include a pair of forks (not shown) for releasably engaging and lifting a pallet. Additionally/alternatively, gripper assembly 40 may include a pair of tongs (not shown) for releasably grasping individual items (e.g., boxes, cartons, assemblies). Additionally/alternatively, gripper assembly 40 may include one or more suctions devices (e.g., suction cups; not shown) for generating a vacuum to releasably grasp individual items having a smooth surface upon which a vacuum may be drawn (e.g., boxes, cartons).

Accordingly and depending upon the manner in which gripper assembly 40 is configured, robotic arm subsystem 26 may be configured to grasp various objects (generally represented as object 42), wherein examples of object 42 may include but are not limited to assemblies, discrete items, boxed discrete items, cartons of boxed items, and loaded pallets.

Self-contained robotic arm system 10 may include control subsystem 44 coupled (i.e., directly or indirectly) to mounting subsystem 12 and configured to effectuate movement of robotic arm assembly 10. Depending upon the manner in which self-contained robotic arm system 10 is configured, control subsystem 44 may include one or more of: a pneumatic control subsystem; an electric control subsystem; and a hydraulic control subsystem.

For example, control subsystem 44 may include a pneumatic control subsystem when it is desired for robotic arm subsystem 26 to effectuate rapid movement (as pneumatic actuators tend to respond more quickly than electric and hydraulic actuators). Further, control subsystem 44 may include an electric control subsystem when it is desired for robotic arm subsystem 26 to effectuate highly-accurate movement (as electric actuators tend to be more accurate and precise than pneumatic and hydraulic actuators). Additionally, control subsystem 44 may include a hydraulic control subsystem when it is desired for robotic arm subsystem 26 to effectuate high-capacity movement (as hydraulic actuators tend to have higher lift capacity than electric and pneumatic actuators).

Naturally, the configuration of control subsystem 44 may vary depending upon the manner in which control subsystem 44 is configured, as discussed below:

If control subsystem 44 includes a pneumatic control subsystem configured for pneumatic actuation, control subsystem 44 may include one or more of: pneumatic controls (generally represented as controls 46); one or more pneumatic actuators (generally represented as joint assemblies 30, 34, 38 and any longitudinally-extendable actuators (not shown) within arms assemblies 32, 36); air compressor (generally represented as pump 48); and air storage tank (generally represented as tank 50).

If control subsystem 44 includes an electric control subsystem configured for electric actuation, control subsystem 44 may include one or more of: electronic controls (generally represented as controls 46); and one or more electronic actuators (generally represented as joint assemblies 30, 34, 38 and any longitudinally-extendable actuators (not shown) within arms assemblies 32, 36).

If control subsystem 44 includes a hydraulic control subsystem configured for hydraulic actuation, control subsystem 44 may include one or more of: hydraulic controls (generally represented as controls 46); one or more hydraulic actuators (generally represented as joint assemblies 30, 34, 38 and any longitudinally-extendable actuators (not shown) within arms assemblies 32, 36); hydraulic pump (generally represented as pump 48); and hydraulic fluid storage tank (generally represented as tank 50).

As discussed above, mounting subsystem 12 may be used as a mounting point for all of the systems/subsystems of self-contained robotic arm system 10, thus allowing self-contained robotic arm system 10 to be easily attached to (and detached from) operating platform 14 as a single/solitary unit. Accordingly, self-contained robotic arm system 10 may include connectivity subsystem 52 coupled (i.e., directly or indirectly) to mounting subsystem 12 and configured to detachably couple self-contained robotic arm system 10 to one or more external systems 54.

For example, connectivity subsystem 52 may include data connectivity subsystem 56 configured to effectuate communication between self-contained robotic arm system 10 and an external control device 58. Examples of data connectivity subsystem 56 may include but are not limited to a hardwired network connection (e.g., an ethernet connection) and a wireless network connection (e.g., a WiFi connection or a Bluetooth connection). Examples of external control device 58 may include but are not limited to an operator control panel, a personal computer, a laptop computer, a tablet computer, and a smart phone.

Further, connectivity subsystem 52 may include power connectivity subsystem 60 configured to provide external power source 62 to self-contained robotic arm system 10. Examples of power connectivity subsystem 60 may include but are not limited to a socket assembly configured to provide power to self-contained robotic arm system 10. Examples of external power source 62 may include power that is provided by a cable coupled to a power source (e.g., an electrical outlet or a breaker panel).

Self-contained robotic arm system 10 may include machine vision system 64 configured to enable a user (not shown) of self-contained robotic arm system 10 to visually monitor areas proximate self-contained robotic arm system 10. Examples of machine vision system 64 may include any currently available machine vision systems, such a visible light system, UV/IR systems, LIDAR systems, RADAR systems, and thermal imaging systems.

Additionally/alternatively, vision system 64 may be configured to provide collision avoidance of robotic arm subsystem 26 with proximate people and/or objects. Additionally/alternatively, vision system 64 may be configured to provide proximity detection for safety purposes to e.g., slow down, redirect and/or stop the movement of robotic arm subsystem 26 when a person or object is proximate the moving pieces of robotic arm subsystem 26 and/or its payload. Such a collision avoidance and/or proximity detection system may be configured to augment the existing proximity sensors on operating platform 14 to which self-contained robotic arm system 10 is releasably attached.

Self-contained robotic arm system 10 may include audio system 66 configured to enable a user (not shown) of self-contained robotic arm system 10 to audibly monitor areas proximate self-contained robotic arm system 10. Examples of audio system 66 may include any currently available microphone systems, such a discrete microphones and/or microphone arrays.

To properly position machine vision system 64 and/or audio system 66 with respect to self-contained robotic arm system 10, machine vision system 64 and/or audio system 66 may be mounted on mast assembly 68 coupled (i.e., directly or indirectly) to mounting subsystem 12. Through the use of mast assembly 68, an elevated point of view may be achieved with respect to the moving parts of self-contained robotic arm system 10, thus providing situational awareness to avoid collision and/or permit safe operation by humans within the reachable proximity of the moving parts of self-contained robotic arm system 10 and/or its payload.

Machine vision system 64 may be configured to include multiple/additional machine vision systems (e.g., multiple/additional cameras). Accordingly, one or more additional cameras may be positioned along robotic arm subsystem 26. For example, these additional cameras may be mounted on robotic arm subsystem 26 and may provide visual target identification for object pick-up and/or positioning, as well as proximate object detection to allow for safe operation of robotic arm subsystem 26 near moving and stationary objects. An example of such a machine vision system may include but is not limited to the Intel® RealSense™ D435 depth camera.

Figure 2:
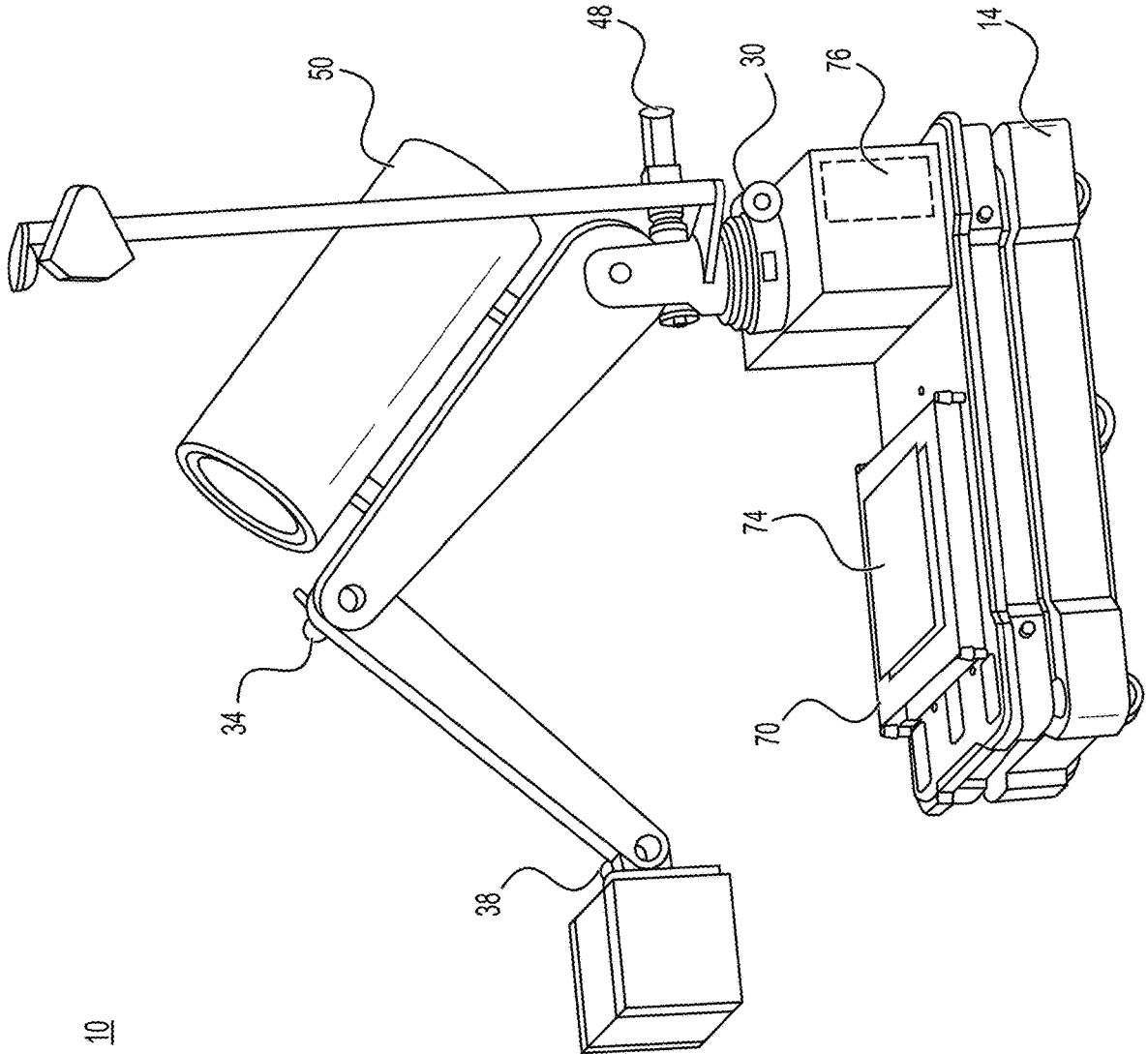
FIG. 2 is another isometric view of the self-contained robotic arm system of FIG. 1 according to an embodiment of the present disclosure.
Figure 3:
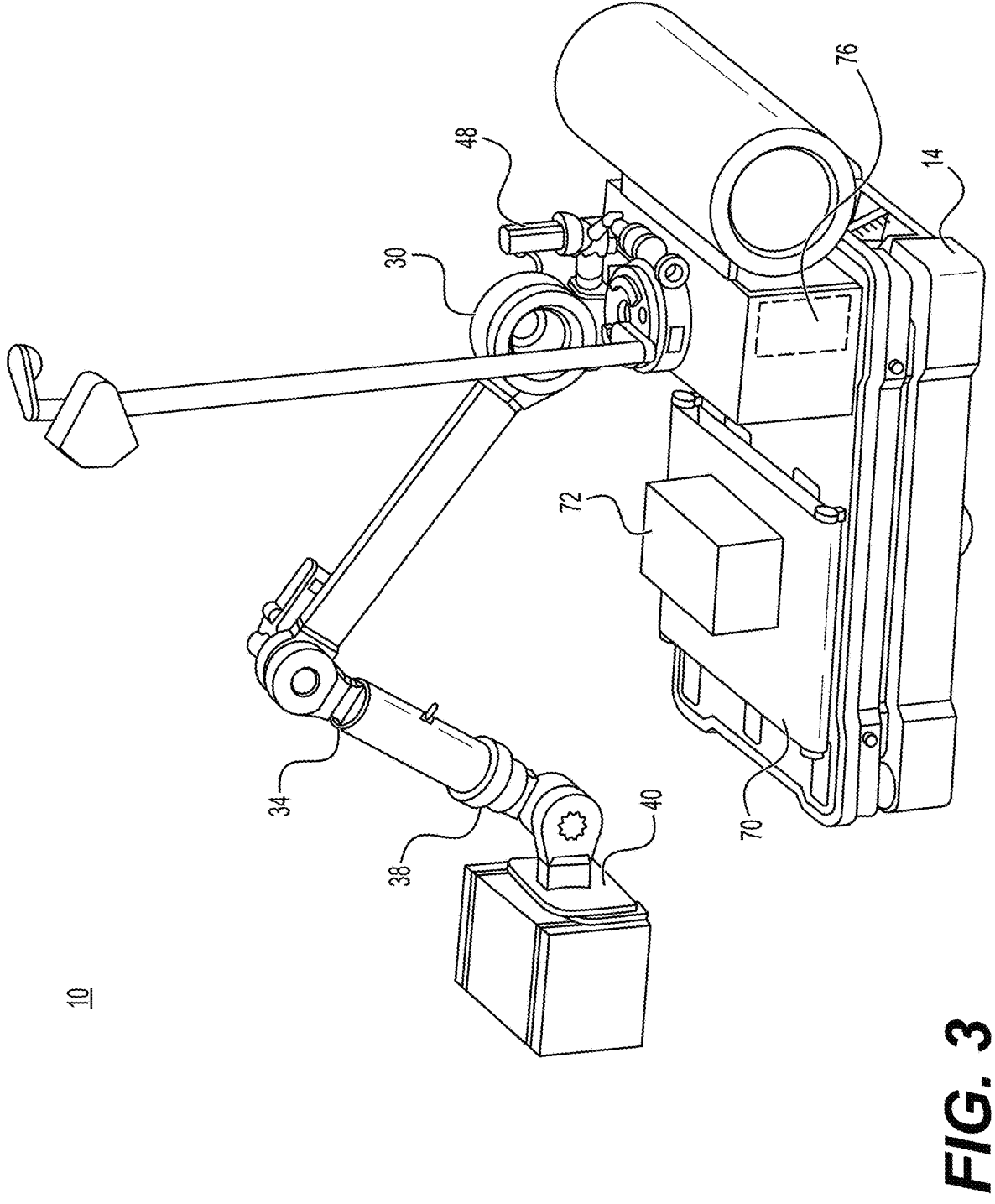
FIG. 3 is another isometric view of the self-contained robotic arm system of FIG. 1 according to an embodiment of the present disclosure.

Referring also to FIG. 2-3, self-contained robotic arm system 10 may be configured to enable easier offloading of objects (e.g., object 72) from operating platform 14. For example, self-contained robotic arm system 10 may include conveyor system 70, wherein conveyor system 70 may be configured to receive objects from and/or provide objects to robotic arm subsystem 10.

For example, as self-contained robotic arm system 10 retrieves objects (e.g., object 72), these objects (e.g., object 72) may be placed onto conveyor system 70, wherein operating platform 14 (e.g., when configured as a mobile base) may navigate to an unloading platform (not shown) that may be configured as e.g., a shelf, a slide or another conveyor belt), thus allowing conveyor system 70 to transfer these objects (e.g., object 72) to the unloading platform (not shown). Further, conveyor system 10 may be configured to receive pallets (e.g., pallet 74), wherein self-contained robotic arm system 10 may retrieve objects (e.g., object 72) that are placed onto pallet 74. Once pallet 74 is fully loaded, pallet 74 may be offloaded from operating platform 14 via conveyor system 70. In such a configuration, the unloading platform (not shown) may be an automated wrapping station (not shown) configured to e.g., shrink wrap pallet 74 and the objects positioned thereon.

Figure 4:
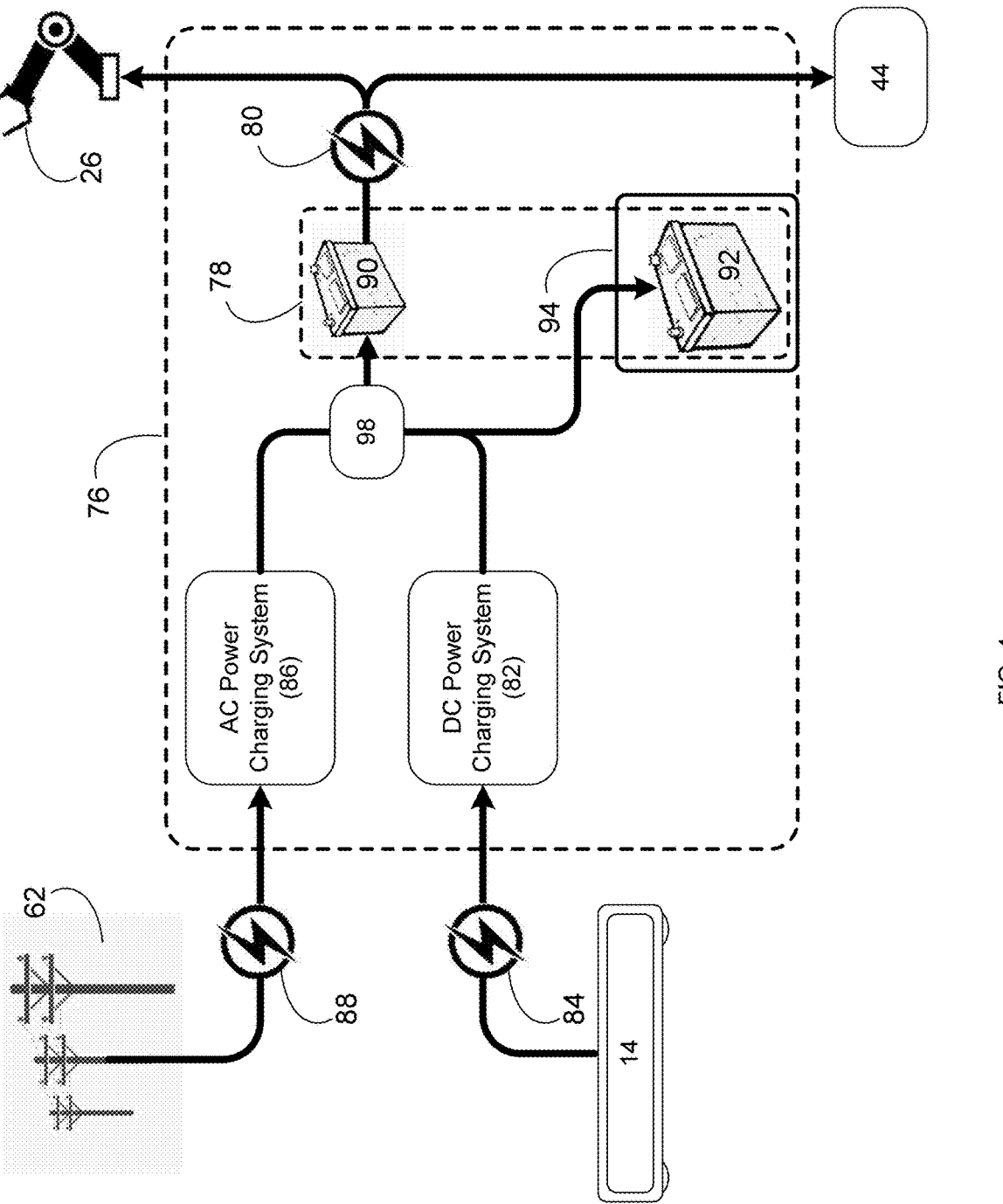
FIG. 4 is a diagrammatic view of the self-contained robotic arm system of FIG. 1 according to an embodiment of the present disclosure.

Referring also to FIG. 4, self-contained robotic arm system 10 may include a power subsystem (e.g., power subsystem 76) that includes an internal battery system (e.g., internal battery system 78) that is configured to provide electrical power (e.g., electrical power 80) to robotic arm subsystem 26 and control subsystem 44. In one particular embodiment of self-contained robotic arm system 10, electrical power 80 may be 48 VDC power and internal battery system 78 may be a battery (e.g., Lithium Ion, Lead Acid, Absorbent Glass Mat, etc.) configured to provide such 48 VDC power.

The power subsystem (e.g., power subsystem 76) may include: a DC power charging system (e.g., DC power charging system 82) configured to receive power (e.g., DC power 84) from the operating platform (e.g., operating platform 14) so that the internal battery system (e.g., internal battery system 78) of the power subsystem (e.g., power subsystem 76) may be charged. Operating platform 14 may be a DC-based operating platform that is powered by 24-48 VDC power. Accordingly, internal batteries (not shown) included within the operating platform (e.g., operating platform 14) may be electrically coupled to the DC power charging system (e.g., DC power charging system 82), wherein the DC power charging system (e.g., DC power charging system 82) may step up (or step down) the power (e.g., DC power 84) provided by the operating platform (e.g., operating platform 14) so that the appropriate power is provided to the internal battery system (e.g., internal battery system 78) for charging purposes.

The power subsystem (e.g., power subsystem 76) may include: an AC power charging system (e.g., AC power charging system 86) configured to receive power (e.g., AC power 88) from an external line voltage source (e.g., external power source 62) so that the internal battery system (e.g., internal battery system 78) of the power subsystem (e.g., power subsystem 76) may be charged.

As discussed above, self-contained robotic arm system 10 may include connectivity subsystem 52 coupled (i.e., directly or indirectly) to mounting subsystem 12 and configured to detachably couple self-contained robotic arm system 10 to one or more external systems 54. Specifically, connectivity subsystem 52 may include power connectivity subsystem 60 configured to provide external power source 62 to self-contained robotic arm system 10. Examples of power connectivity subsystem 60 may include but are not limited to a socket assembly configured to provide power to self-contained robotic arm system 10. Examples of external power source 62 may include power that is provided by a cable coupled to a power source (e.g., an electrical outlet or a breaker panel).

External power source 62 may be an AC-based external power source that provides generally-available 110-220 VAC electrical power (e.g., AC power 88). Accordingly, external power source 62 may be electrically coupled to the AC power charging system (e.g., AC power charging system 86), wherein the AC power charging system (e.g., AC power charging system 86) may rectify and step down the power (e.g., AC power 88) provided by the external power source (e.g., external power source 62) so that the appropriate power is provided to the internal battery system (e.g., internal battery system 78) for charging purposes.

The internal battery system (e.g., internal battery system 78) of the power subsystem (e.g., power subsystem 76) may include: a non-swappable battery portion (e.g., non-swappable system 90); and a hot-swappable battery portion (e.g., hot-swappable battery system 92) that is readily removeable/replaceable. In such a configuration, the hot-swappable battery portion (e.g., hot-swappable battery system 92) may charge the non-swappable battery portion (e.g., non-swappable system 90).

Figure 5:
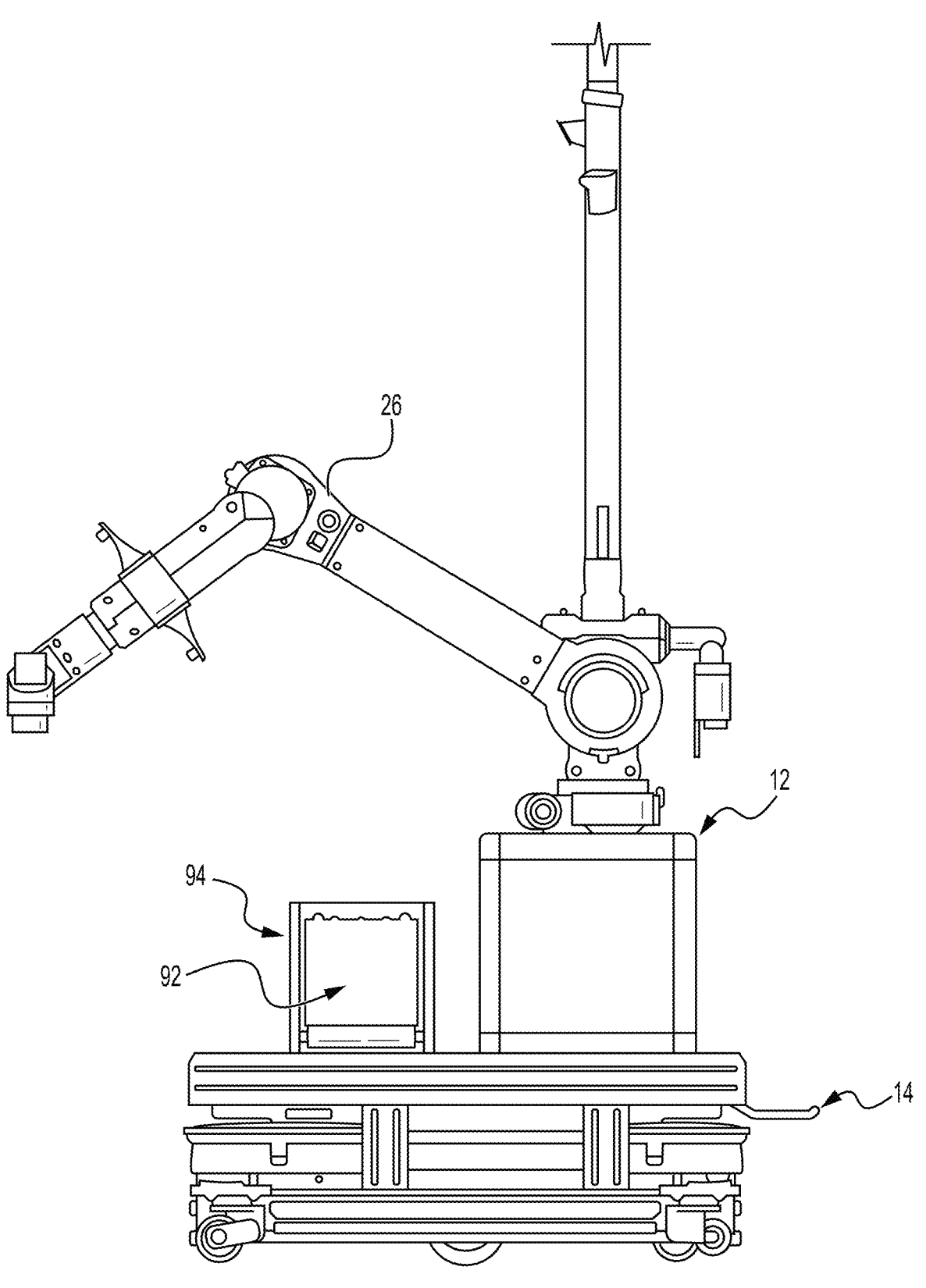
FIGS. 5-6 are isometric views of the self-contained robotic arm system of FIG. 1 according to an embodiment of the present disclosure.
Figure 6:
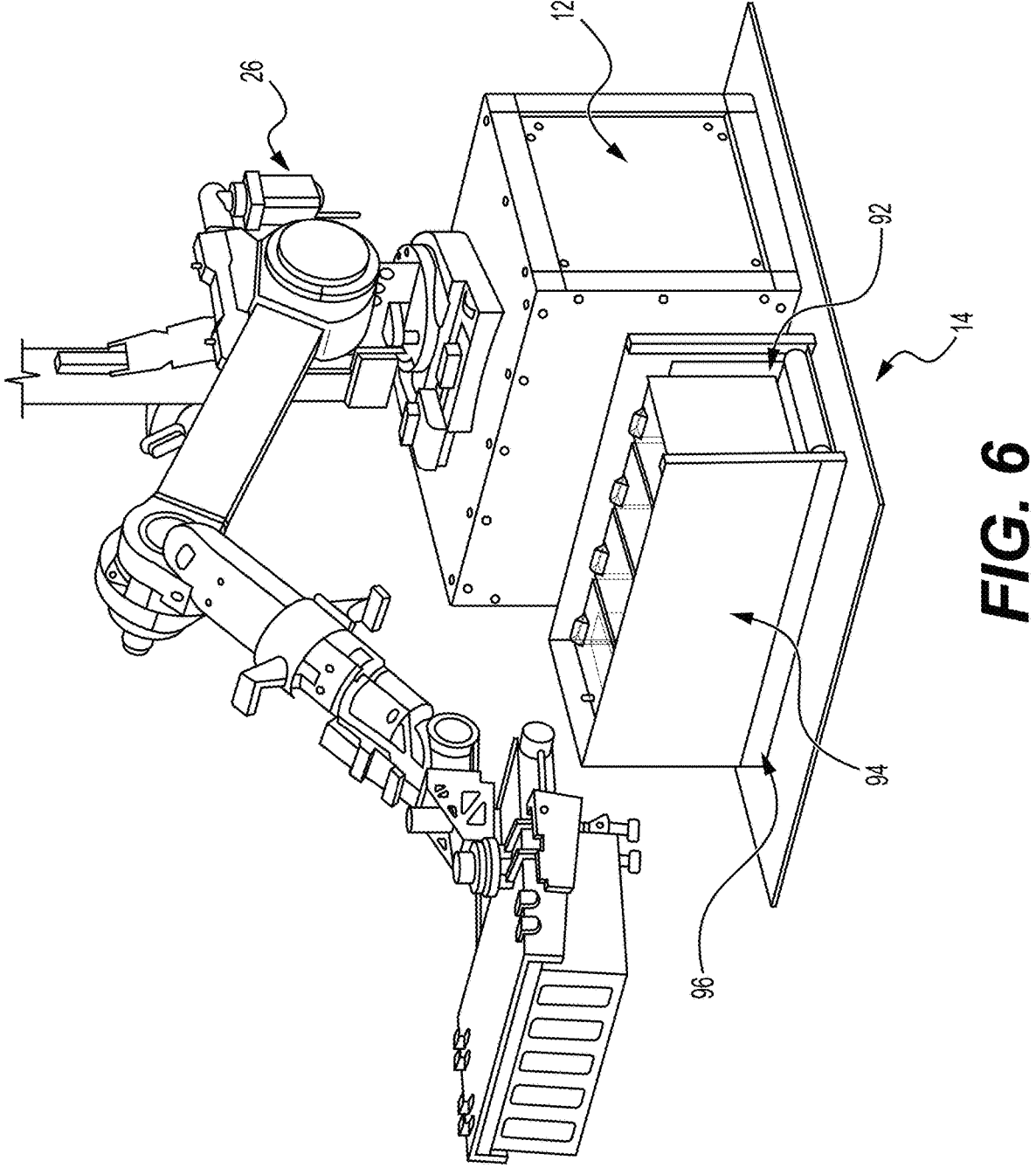

Referring also to FIGS. 5-6, in order to enable the hot-swappable battery portion (e.g., hot-swappable battery system 92) to be readily removeable/replaceable, hot-swappable battery system 92 may be housed in a battery bay (e.g., battery bay 94) that enables the easy insertion/removal of hot-swappable battery system 90. As it is foreseeable that hot-swappable battery system 92 may be rather heavy, battery bay 94 may include a roller floor (e.g., roller floor 96) to enable hot-swappable battery system 92 to easily slide into (and out of) battery bay 94.

Power subsystem 76 may include automatic selector system 98 to ensure that only a single power source is allowed to charge internal battery system 78. For example, automatic selector system 98 may be configured to monitor the voltages present on the input side of automatic selector system 98 to determine which power sources are available for charging purposes. Accordingly and in the event that multiple sources are simultaneously available, self-contained robotic arm system 10 may have a preferred priority for charging purposes. For example and for illustrative purposes only, if power is available from AC power charging system 86, automatic selector system 98 may choose AC power charging system 86, as that is attached to landline power source 62 and provides the ability to charge internal battery system 78 without having to discharge another battery. And if power is not available from AC power charging system 86, but is available from hot-swappable battery system 92 and DC power charging system 82, automatic selector system 98 may choose hot-swappable battery system 92 to avoid discharging operating platform 14. And if power is only available from DC power charging system 82, automatic selector system 98 may utilize the same to effectuate such charging.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 14).

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A self-contained robotic arm system comprising:

an operating platform;

a robotic arm subsystem coupled to the operating platform;

a control subsystem coupled to the operating platform and configured to effectuate movement of the robotic arm subsystem; and a power subsystem including an internal battery system that is configured to provide electrical power to the robotic arm subsystem and the control subsystem, wherein the internal battery system of the power subsystem includes:

a non-swappable battery portion, wherein the non-swappable battery portion is electrically coupled directly to the robotic arm subsystem and the control subsystem and provides the electrical power to the robotic arm subsystem and the control subsystem; and a hot-swappable battery portion that is readily removeable/replaceable, wherein the hot-swappable battery portion is electrically coupled to the non-swappable battery portion and charges the non-swappable battery portion without being electrically coupled directly to the robotic arm subsystem and the control subsystem.

2. The self-contained robotic arm system of claim 1, wherein the power subsystem includes:

an AC power charging system configured to receive power from an external line voltage source so that the internal battery system of the power subsystem is charged.

3. The self-contained robotic arm system of claim 1, wherein the power subsystem includes:

a DC power charging system configured to receive power from the operating platform so that the internal battery system is charged.

4. The self-contained robotic arm system of claim 1, further comprising:

a machine vision system configured to enable a user of the self-contained robotic arm system to visually monitor areas proximate the self-contained robotic arm system.

5. The self-contained robotic arm system of claim 1, further comprising:

an audio system configured to enable a user of the self-contained robotic arm system to audibly monitor areas proximate the self-contained robotic arm system.

6. The self-contained robotic arm system of claim 1, wherein the control subsystem includes one or more of:

a pneumatic control subsystem;

a electric control subsystem; and a hydraulic control subsystem.

7. The self-contained robotic arm system of claim 6, wherein the pneumatic control subsystem includes one or more of:

pneumatic controls;

one or more pneumatic actuators;

an air compressor; and an air storage tank.

8. The self-contained robotic arm system of claim 6, wherein the electric control subsystem includes one or more of:

electronic controls; and one or more electronic actuators.

9. The self-contained robotic arm system of claim 6, wherein the hydraulic control subsystem includes one or more of:

hydraulic controls;

one or more hydraulic actuators;

a hydraulic pump; and a hydraulic fluid storage tank.

10. The self-contained robotic arm system of claim 1, wherein the robotic arm subsystem includes one or more of:

an arm base assembly;

a shoulder joint assembly coupled to the arm base assembly;

an upper arm assembly coupled to the should joint assembly;

an elbow joint assembly coupled to the upper arm assembly;

a lower arm assembly coupled to the elbow joint assembly;

a wrist joint assembly coupled to the lower arm assembly; and a gripper assembly coupled to the wrist joint assembly.

11. The self-contained robotic arm system of claim 10, wherein the shoulder joint assembly is configured to enable rotation about one or more of the X, Y and Z axis.

12. The self-contained robotic arm system of claim 10, wherein the elbow joint assembly is configured to enable rotation about one or more of the X, Y and Z axis.

13. The self-contained robotic arm system of claim 10, wherein the wrist joint assembly is configured to enable rotation about one or more of the X, Y and Z axis.

14. The self-contained robotic arm system of claim 1, wherein the operating platform is a moveable operating platform.

15. The self-contained robotic arm system of claim 14, wherein the moveable operating platform includes one or more of:

an autonomous mobile base;

a non-autonomous mobile base;

a forklift; and a truck.

16. A self-contained robotic arm system comprising:

an operating platform;

a robotic arm subsystem coupled to the operating platform;

a control subsystem coupled to the operating platform and configured to effectuate movement of the robotic arm subsystem; and a power subsystem including:

an AC power charging system configured to receive power from an external line voltage source so that the internal battery system of the power subsystem is charged;

a DC power charging system configured to receive power from the operating platform so that the internal battery system of the power subsystem is charged; and an internal battery system that is configured to provide electrical power to the robotic arm subsystem and the control subsystem, wherein the internal battery system of the power subsystem includes:

a non-swappable battery portion is electrically coupled directly to the robotic arm subsystem and the control subsystem; and a hot-swappable battery portion that is readily removeable/replaceable, wherein the hot-swappable battery portion is electrically coupled to the non-swappable battery portion and charges the non-swappable battery portion without being electrically coupled directly to the robotic arm subsystem and the control subsystem and is housed in a battery bay with a roller floor that slides the hot-swappable battery portion to slide into and out of the battery bay.

17. The self-contained robotic arm system of claim 16, further comprising:

a machine vision system configured to enable a user of the self-contained robotic arm system to visually monitor areas proximate the self-contained robotic arm system.

18. The self-contained robotic arm system of claim 16, further comprising:

an audio system configured to enable a user of the self-contained robotic arm system to audibly monitor areas proximate the self-contained robotic arm system.

19. A self-contained robotic arm system comprising:

an operating platform;

a robotic arm subsystem coupled to the operating platform;

a control subsystem coupled to the operating platform and configured to effectuate movement of the robotic arm subsystem; and a power subsystem including an internal battery system that is configured to provide electrical power to the robotic arm subsystem and the control subsystem, wherein the internal battery system of the power subsystem includes:

a non-swappable battery portion, wherein the non-swappable battery portion is electrically coupled directly to the robotic arm subsystem and the control subsystem and provides the electrical power to the robotic arm subsystem and the control subsystem; and a hot-swappable battery portion that is readily removeable/replaceable, wherein the hot-swappable battery portion is electrically coupled to the non-swappable battery portion and charges the non-swappable battery portion without being electrically coupled directly to the robotic arm subsystem and the control subsystem and is housed in a battery bay with a roller floor that slides the hot-swappable battery portion to slide into and out of the battery bay.

20. The self-contained robotic arm system of claim 19, wherein the power subsystem includes:

an AC power charging system configured to receive power from an external line voltage source so that the internal battery system of the power subsystem is charged.

21. The self-contained robotic arm system of claim 19, wherein the power subsystem includes:

a DC power charging system configured to receive power from the operating platform so that the internal battery system of the power subsystem is charged.

22. The self-contained robotic arm system of claim 19, further comprising:

a machine vision system configured to enable a user of the self-contained robotic arm system to visually monitor areas proximate the self-contained robotic arm system.

23. The self-contained robotic arm system of claim 19, further comprising:

an audio system configured to enable a user of the self-contained robotic arm system to audibly monitor areas proximate the self-contained robotic arm system.

* * * * *